US007794879B2

(12) United States Patent
Yamaki et al.

(10) Patent No.: US 7,794,879 B2
(45) Date of Patent: Sep. 14, 2010

(54) POSITIVE ELECTRODE ACTIVE MATERIAL FOR NON-AQUEOUS ELECTROLYTE SECONDARY CELL

(75) Inventors: Jun-ichi Yamaki, 4-1-2-103, Kasugakoen, Kasuga-shi, Fukuoka (JP); Shigeto Okada, 1-2-6-1311, Momochihama, Sawara-ku, Fukuoka-shi, Fukuoka (JP); Toshiyasu Kiyabu, Nagasaki (JP); Kenji Nakane, Tsukuba (JP)

(73) Assignees: Jun-ichi Yamaki, Fukuoka (JP); Shigeto Okada, Fukuoka (JP); Sumitomo Chemical Company Limited, Tokyo (JP)

(*) Notice: Subject to any disclaimer, the term of this patent is extended or adjusted under 35 U.S.C. 154(b) by 102 days.

(21) Appl. No.: 10/599,393

(22) PCT Filed: Mar. 30, 2005

(86) PCT No.: PCT/JP2005/006117
§ 371 (c)(1), (2), (4) Date: Sep. 27, 2006

(87) PCT Pub. No.: WO2005/096415
PCT Pub. Date: Oct. 13, 2005

(65) Prior Publication Data
US 2007/0212605 A1    Sep. 13, 2007

(30) Foreign Application Priority Data
Mar. 31, 2004    (JP)    ............................. 2004-104338

(51) Int. Cl.
*H01M 4/52*    (2010.01)
(52) U.S. Cl. .................................................... 429/221
(58) Field of Classification Search ................ 429/221, 429/231.1, 218.1; 423/594.2

See application file for complete search history.

(56) References Cited

U.S. PATENT DOCUMENTS

| 5,503,930 A | 4/1996 | Maruyama et al. | |
| 2004/0029007 A1* | 2/2004 | Kusumoto et al. | 429/221 |
| 2006/0239883 A1* | 10/2006 | Kang et al. | 423/304 |

FOREIGN PATENT DOCUMENTS

| JP | 8-55624 A | 2/1996 |
| JP | 11-40156 A | 2/1999 |
| JP | 2001-283852 A | 5/2000 |
| JP | 2000-133249 A | 5/2002 |
| JP | 2002-151074 A | 5/2002 |

OTHER PUBLICATIONS

Materials Research Bulletin, vol. 29, No. 6, pp. 659-666, 1994.*
Materials Research Bulletin, vol. 29, No. 6, (1994), pp. 659-666.
* cited by examiner

*Primary Examiner*—Jennifer Michener
*Assistant Examiner*—Monique Wills
(74) *Attorney, Agent, or Firm*—Sughrue Mion, PLLC

(57) ABSTRACT

A positive electrode active material for a non-aqueous electrode secondary cell which comprises a composite oxide containing iron and sodium as main components, having a hexagonal crystal structure, and exhibiting a value obtained by dividing the intensity of a peak corresponding to an interplanar spacing of 2.20 Å by the intensity of a peak corresponding to an interplanar spacing of 5.36 Å of 2 or less in the X-ray diffraction analysis of said composite oxide; and a method for preparing the positive electrode active material wherein the above composite oxide is prepared by heating a metal compound mixture mainly containing a sodium compound and an iron compound in the temperature range of 400 to 900° C., which comprises heating the metal compound mixture in an inert atmosphere in the temperature range of less than 100° C. on the way of the rise in the temperature. The use of the above active material allows the manufacture of a cell which is free from the rapid reduction of the discharge voltage with the progress of discharge.

2 Claims, 1 Drawing Sheet

POSITIVE ELECTRODE ACTIVE MATERIAL FOR NON-AQUEOUS ELECTROLYTE SECONDARY CELL

This is a National Stage application under 35 U.S.C. §371 of PCT/JP2005/006117 filed on Mar. 30, 2005, which claims benefit from Japanese Patent Application 2004-104338 filed Mar. 31, 2004, all of which are incorporated herein by reference.

TECHNICAL FIELD

The present invention relates to a positive electrode active material for non-aqueous electrolyte secondary batteries.

BACKGROUND ART

Non-aqueous electrolyte lithium secondary batteries are put to practical use as secondary batteries for portable electronic devices and are widely used. However, $LiCoO_2$ which is a compound of Co, which is expensive and less in the deposit amount as resources, is used as the positive electrode active material of the batteries, and there has been demanded a positive electrode active material for non-aqueous electrolyte secondary batteries which comprises a compound containing mainly the abundant element as resources.

Thus, $NaFeO_2$ which is a composite oxide of iron and sodium which are abundant elements as resources has been proposed as a positive electrode active material for non-aqueous electrolyte secondary batteries, and it is known that this compound is obtained by mixing $Na_2O_2$ and $Fe_3O_4$ and firing the mixture at 600-700° C. in the air (see, for example, Non-Patent Document 1).

Non-Patent Document 1: Materials Research Bulletin (U.S.A.), Pergamon Press, 1994, Vol. 29, No. 6, p. 659-666

DISCLOSURE OF INVENTION

Problem to be Solved by the Invention

The above non-aqueous electrolyte secondary batteries which use a positive electrode active material comprising $NaFeO_2$ suffer from the problem that the discharge voltage rapidly reduces with progress of discharge (see, for example, Non-Patent Document 1).

Therefore, the object of the present invention is to provide a positive electrode active material for non-aqueous electrolyte secondary batteries which comprise mainly a composite oxide of iron and sodium and gives non-aqueous electrolyte secondary batteries free from the rapid reduction of discharge voltage with the progress of discharge, and a method for producing the positive electrode active material.

Means For Solving The Problem

As a result of intensive research conducted by the inventors on positive electrode active materials comprising a composite oxide containing mainly iron and sodium, it has been found that a non-aqueous electrolyte secondary battery free from the rapid reduction of discharge voltage with the progress of discharge can be obtained by using the composite oxide which has a hexagonal crystal structure and has an intensity ratio of specific two XRD peaks within a specific range in the X-ray diffraction (XRD) analysis. Furthermore, it has been found that the above positive electrode active material is obtained by a method which comprises heating a mixture of metal compounds containing mainly a sodium compound and an iron compound where the mixture is heated in a specific atmosphere before reaching a specific temperature in the course of rising of the temperature. Thus, the present invention has been accomplished.

That is, the present invention provides a positive electrode active material for non-aqueous electrolyte secondary battery which comprises a composite oxide containing mainly iron and sodium, having a hexagonal crystal structure, and exhibiting a value of 2 or less obtained by dividing the XRD peak intensity corresponding to an interplanar spacing of 2.20 Å by the XRD peak intensity corresponding to an interplanar spacing of 5.36 Å. Furthermore, the present invention provides a method for producing a positive electrode active material for non-aqueous electrolyte secondary battery by heating a mixture of metal compounds containing a sodium compound and an iron compound at a temperature in the range from 400° C. to 900° C. to produce a composite oxide comprising mainly a sodium compound and an iron compound, which comprises heating the mixture in an inert atmosphere in the temperature range of lower than 100° C. in the course of rising of the temperature. Moreover, the present invention provides a non-aqueous electrolyte sodium secondary battery made using the above-mentioned positive electrode active material for non-aqueous electrolyte secondary battery.

ADVANTAGES OF THE INVENTION

When the positive electrode active material of the present invention is used, there can be produced a non-aqueous electrolyte secondary battery which is free from the rapid reduction of discharge voltage with the progress of discharge, high in discharge voltage in the part of the plateau of discharge, namely, 3 V or higher, and excellent in characteristics as a secondary battery, and according to the production method of the present invention, the positive electrode active material of the present invention can be produced. Thus, the present invention is industrially very useful.

BEST MODE FOR CARRYING OUT THE INVENTION

The positive electrode active material for non-aqueous electrolyte secondary battery of the present invention comprises a composite oxide containing mainly sodium and iron.

A specific example of the composite oxide is a compound represented by the following formula (1):

$$NaFe_{1-x}M_xO_2 \quad (1)$$

(wherein M is at least one trivalent metal).

As the M, mention may be made of at least one element selected from the group consisting of Al, Ga, In, Sc, Ti, V, Cr, Mn, Co, Ni, Y, Nb, Mo, La, Ce, Pr, Nd, Sm, Eu, Gd, Tb, Dy, Ho, Er, Tm, Yb and Lu. Among them, at least one element selected from the group consisting of Al, Ga, V, Mn, Co, Ni, Y and La is preferred since the discharge voltage tends to increase, and from the viewpoint of resources, especially preferred is at least one element selected from the group consisting of Al, Mn and Ni which is abundant in the amount of deposits. The compositional ratio of Na, Fe and M in the above formula means a mixing ratio of the respective elements in the starting materials (the composition of the final product does not necessarily coincident with the charging ratio in view of vapor pressure of each element source at the synthesis temperature, and particularly in the case of firing at a high temperature for a long time, Na is volatilized to cause deficiency of Na in some cases, but as long as the final product holds a hexagonal α-NaFeO₂ type structure, the deficiency of Na causes no conspicuous hindrance to development of positive electrode characteristics). The value of x can be selected from the range of $0 \leq x < 0.5$ in which the hexagonal crystal structure is held, and the range of $0 \leq x < 0.1$ is preferred since the discharge capacity tends to increase, and the case of x=0 in which M is not contained is particularly preferred. Since 1-x which is a coefficient of Fe is larger than 0.5, the compound represented by the formula (1) is a composite oxide containing mainly iron and sodium.

In the present invention, this composite oxide has a hexagonal crystal structure, in which the value obtained by dividing the XRD peak intensity corresponding to an interplanar spacing of 2.20 Å by the XRD peak intensity corresponding to an interplanar spacing of 5.36 Å in the XRD analysis of the composite oxide, namely, the ratio of heights of XRD peaks, is 2 or less. In the case of the conventional composite oxide $NaFeO_2$, the value obtained by dividing the XRD peak intensity corresponding to an interplanar spacing of 2.20 Å by the XRD peak intensity corresponding to an interplanar spacing of 5.36 Å is greater than 2, and in the case of, for example, the $NaFeO_2$ disclosed in the Non-Patent Document 1, the value obtained by dividing the XRD peak intensity corresponding to an interplanar spacing of 2.20 Å by the XRD peak intensity corresponding to an interplanar spacing of 5.36 Å is 2.3 as can be seen from the XRD chart in the Non-Patent Document 1.

These XRD peaks corresponding to the interplanar spacing of 2.20 Å and the interplanar spacing of 5.36 Å correspond to the XRD peaks at (104) plane and (003) plane of the α-NaFeO₂ type structure, respectively. There are some variations in the interplanar spacing of the crystal lattice depending on the metal elements other than Na and Fe contained in the composite oxide and the production method, and since the XRD peak corresponding to 2.20 Å has a variation in the width of ±0.02 Å, the interplanar spacing is specifically 2.20±0.02 Å, and since the XRD peak corresponding to 5.36 Å has a variation in the width of ±0.04 Å, the interplanar spacing is specifically 5.36±0.04 Å. Therefore, in this specification, the XRD peak corresponding to an interplanar spacing of 2.20 Å means a XRD peak corresponding to an interplanar spacing of 2.20±0.02 Å which corresponds to the XRD peak at (104) plane of the α-NaFeO₂ type structure, and similarly the XRD peak corresponding to an interplanar spacing of 5.36 Å means a XRD peak corresponding to an interplanar spacing of 5.36±0.04 Å which corresponds to the XRD peak at (003) plane of the α-NaFeO₂ type structure. In case the value r obtained by dividing the XRD peak intensity corresponding to an interplanar spacing of 2.20 Å by the XRD peak intensity corresponding to an interplanar spacing of 5.36 Å is 2 or less, although the reason is not clear, the composite oxide containing mainly iron and sodium becomes a positive electrode active material for non-aqueous electrolyte secondary battery which gives a non-aqueous electrolyte secondary battery free from the rapid reduction of discharge voltage with the progress of discharge. The value r is preferably 1.7 or less and more preferably 1.5 or less.

Next, the method for producing the positive electrode active material of the present invention will be explained.

The positive electrode active material of the present invention can be produced by a method of heating a metal compound mixture containing mainly a sodium compound and an iron compound at a temperature in the range from 400° C. to 900° C., in which the mixture is heated in an inert atmosphere in the temperature range of lower than 100° C. in the course of rising of the temperature.

As the sodium compound, the iron compound and the compounds of M in the formula (1), there may be used oxides, hydroxides, carbonates, nitrates, sulfates, acetates, oxalates, halides, etc., and the sodium compound is especially preferably $Na_2O_2$ and the iron compound is especially preferably $Fe_3O_4$.

The mixture of metal compounds which mainly comprises a sodium compound and an iron compound can be obtained by weighing each metal compound at a given molar ratio and mixing the weighed metal compounds by dry or wet mixing method. The dry mixing method is simple and preferred, and can be carried out by industrially usually employed apparatuses such as mortar, rotating stirrer, V-type mixer, W-type mixer, ribbon mixer, drum mixer, and ball mill.

The positive electrode active material of the present invention can be obtained by heating the resulting metal compound mixture, and this heating is carried out in an inert atmosphere at a temperature of lower than 100° C. in the course of the rising of the temperature. As the inert atmosphere, there may be used one or two or more atmospheres selected from argon, helium, neon, nitrogen, carbon dioxide, etc., and argon, nitrogen or mixtures thereof are preferred. The mixing ratio is not particularly limited, and can be optionally set.

This inert atmosphere may contain up to about 1 vol % of oxygen or hydrogen. If water vapor is contained in a large amount, the resulting positive electrode active material may not give a non-aqueous electrolyte secondary battery in which the discharge voltage does not rapidly reduce with the progress of discharge, and the dew point of the inert atmosphere used in the production method of the present invention is preferably 0° C. or lower. The inert atmosphere may not be used at lower than 100° C. in the course of the falling of the temperature after reaching the heating temperature. It is preferred to use an inert atmosphere also in weighing and mixing of the metal compounds.

In the temperature range of 100° C. or higher, the atmosphere is not particularly limited, and may be any of the above-mentioned inert atmosphere; an inert atmosphere containing 1 vol % or more of oxygen; an oxidizing atmosphere such as oxygen; an inert atmosphere containing hydrogen and/or carbon monoxide; and a reducing atmosphere such as hydrogen or carbon monoxide, and furthermore it may contain halogen. The oxidizing atmosphere is preferred, and air and oxygen are more preferred.

The heating temperature is in the range preferably from 400° C. to 900° C., more preferably from 600° C. to 760° C., and the keeping time in this temperature range is usually from 2 hours to 30 hours. The mixture may be compression molded into a pellet before heating. The temperature rising rate before reaching the heating time is not particularly limited, but is preferably 600° C./hour or lower. The temperature falling rate before reaching room temperature after heating is not particularly limited, but is preferably 600° C./hour or lower. Furthermore, when the temperature falling rate is lowered by cooling in a furnace, layer structure sometimes develops to result in increase of discharge capacity.

It is necessary that in the furnace used for heating, the atmosphere can be replaced. The furnace is preferably such that can be subjected to vacuum replacement (an operation of evacuating the furnace using a vacuum pump and then introducing a desired gas into the furnace), but it may be a tubular furnace through which an atmosphere gas can be efficiently flowed.

Furthermore, the positive electrode active material obtained by heating can be adjusted to a desired particle size by a known method which is industrially usually employed, such as vibration mill, jet mill or dry ball mill.

Next, the non-aqueous electrolyte sodium secondary battery containing the positive electrode active material of the present invention will be explained.

It is known that a non-aqueous electrolyte secondary battery which uses a conventional positive electrode active material comprising $NaFeO_2$ for a positive electrode and sodium ion as a main charge carrier are not sufficient in the characteristics as a secondary battery. Therefore, as the non-aqueous electrolyte secondary battery using the conventional positive electrode active material comprising $NaFeO_2$ for the positive electrode, there has been proposed a non-aqueous electrolyte secondary battery in which a non-aqueous electrolyte containing lithium perchlorate and a negative electrode comprising metallic lithium are used, and not sodium ion, but lithium ion is mainly used as the charge carrier (see, for example, Non-Patent Document 1). However, when a non-aqueous electrolyte sodium secondary battery is produced using the positive electrode active material discovered by the inventors, surprisingly, the resulting non-aqueous electrolyte sodium secondary battery is free from the rapid reduction of discharge voltage with the progress of discharge and high in discharge voltage in the part of the plateau of discharge, namely, 3 V or higher, and shows satisfactory characteristics.

First, the positive electrode of the non-aqueous electrolyte sodium secondary battery of the present invention which contains the positive electrode active material of the present invention can be produced by supporting a positive electrode mix containing the positive electrode active material and additionally a carbonaceous material as a conductive material, a binder, etc. on a positive electrode current collector. The carbonaceous materials include, for example, natural graphite, artificial graphite, cokes and carbon black. The conductive materials may be used each alone or in admixture of, for example, artificial graphite and carbon black.

As the binder, a thermoplastic resin is ordinarily used, and examples of the binder are polyvinylidene fluoride (hereinafter sometimes referred to as "PVDF"), polytetrafluoroethylene (hereinafter sometimes referred to as "PTFE"), ethylene tetrafluoride-propylene hexafluoride-vinylidene fluoride copolymers, propylene hexafluoride-vinylidene fluoride copolymers, ethylene tetrafluoride-perfluorovinyl ether copolymers, etc. These may be used each alone or in admixture of two or more. The amounts of the positive electrode active material, the carbonaceous material and the binder are optionally set depending on the purpose.

Al, Ni, stainless steel, or the like can be used as the positive electrode current collector, and Al is preferred because it can be easily worked to thin films and is inexpensive. For supporting the positive electrode mix on the positive electrode current collector, there may be used a method of pressure molding or a method of preparing a paste using a solvent and coating the paste on the positive electrode current collector, followed by drying and pressing to fix the coat on the current collector. If necessary, an active material other than the positive electrode active material for non-aqueous secondary battery of the present invention may be incorporated into the positive electrode.

Next, as a negative electrode of the non-aqueous electrolyte sodium secondary battery of the present invention, there may be used, for example, sodium metal, sodium alloys, or materials which can be subjected to doping/dedoping of sodium ion. As the materials which can be subjected to doping/dedoping of sodium ion, mention may be made of carbonaceous materials, chalcogen compounds such as oxides and sulfides which can be subjected to doping/dedoping of sodium ion under a potential lower than that of the positive electrode, borates, etc.

If necessary, a thermoplastic resin can be added to the negative electrode material as a binder. The thermoplastic resins include, for example, PVDF, polyethylene, polypropylene, etc. The amount of the thermoplastic resins used is optionally set depending on the purpose.

As the negative electrode current collector. Cu, Ni, stainless steel, etc. can be used, and Cu is particularly preferred because it hardly produces alloys with sodium and it can be easily worked to thin films. For supporting a mix containing the negative electrode active material on the negative electrode current collector, there may be used a method of pressure molding or a method of preparing a paste using a solvent and coating the paste on the negative electrode current collector, followed by drying and pressing to fix the coat on the current collector.

As the separators used in the non-aqueous electrolyte sodium secondary battery of the present invention, there may be used, for example. materials in the form of porous film, nonwoven fabric and woven fabric which comprise polyolefin resins such as polyethylene and polypropylene, fluorocarbon resins, nylons, aromatic aramids, etc. The thickness of the separators is usually about 10-200 μm.

Next, as the solvents used for the non-aqueous electrolytes used in the non-aqueous electrolyte sodium secondary battery of the present invention, there may be used, for example, carbonates such as propylene carbonate, ethylene carbonate, vinylene carbonate, dimethyl carbonate, diethyl carbonate, ethylmethyl carbonate, 4-trifluoromethyl-1,3-dioxolan-2-one and 1,2-di(methoxycarbonyloxy)ethane; ethers such as 1,2-dimethoxyethane, 1,3-dimethoxypropane, pentafluoropropylmethyl ether, 2,2,3,3-tetrafluoropropyldifluoromethyl ether, tetrahydrofuran and 2-methyltetrahydrofuran; esters such as methyl formate, methyl acetate and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulforan, dimethyl sulfoxide, 1,3-propanesultone, ethylene sulfite, propylene sulfite, dimethyl sulfite and diethyl sulfite, and these organic solvents into which fluorine substitutent is further introduced. Generally, mixtures of two or more of them are used. Of these solvents, mixed solvents containing carbonates are preferred, and mixed solvents of cyclic carbonates and non-cyclic carbonates or mixed solvents of cyclic carbonates and ethers are more preferred. The mixing ratio of them is not particularly limited, and is optionally set according to the purpose.

As the mixed solvents of cyclic carbonates and non-cyclic carbonates, mixed solvents containing ethylene carbonate, dimethyl carbonate and ethylmethyl carbonate are preferred because they have a wide operating temperature range and are excellent in load characteristics.

As solutes, there are used one or more of solutes selected from $NaClO_4$, $NaPF_6$, $NaBF_4$, $NaCF_3SO_3$, $NaN(CF_3SO_2)_2$, $NaN(C_2F_5SO_2)_2$, $NaC(CF_3SO_2)_3$, etc. The mixing ratio of the solvent and solute is not particularly limited, and is optionally set depending on the purpose.

A solid electrolyte may be used as the non-aqueous electrolyte, and as the solid electrolyte, there can be used electrolytes comprising, for example, polymeric compounds of polyethylene oxide type, polymeric compounds containing at least one of polyorganosiloxane chains or polyoxyalkylene chains. Moreover, polymers in which non-aqueous electrolyte solution is held, namely, so-called gel type electrolytes can also be used. When electrolytes comprising inorganic compounds are used, safety can sometimes be enhanced.

The shape of the non-aqueous secondary battery of the present invention is not particularly limited, and may be any of paper type, coin type, cylindrical type, rectangular type, etc.

The outer case of the battery may not be a metallic hard case which also serves as a terminal of negative electrode or positive electrode, and there may be used a bag-like package comprising a laminate sheet containing aluminum, or the like.

Being different from the conventional non-aqueous electrolyte sodium secondary battery which is unsatisfactory in characteristics, the non-aqueous electrolyte sodium secondary battery produced using the positive electrode active material of the present invention is free from the rapid reduction of discharge voltage with the progress of discharge.

Furthermore, the non-aqueous electrolyte sodium secondary battery produced using the positive electrode active material of the present invention has a high discharge voltage in the part of plateau of discharge. The part of plateau of discharge means the portion of a discharge curve in which the discharge voltage does not greatly change with progress of discharge after beginning of reduction of voltage in the initial stage of discharge after starting of discharge. Here, the discharge voltage in the part of plateau of discharge is a voltage in the case of discharging at a current density of 0.1 mA/cm$^2$ or higher based on the area of the positive electrode (the voltage may be measured to be lower when the current density is too high), and can be measured, for example, under the following conditions.

Electrolyte: a solution prepared by dissolving $NaClO_4$ in propylene carbonate (hereinafter sometimes referred to as "PC") to give a concentration of 1 mol/liter (hereinafter sometimes referred to as "1M $NaClO_4$/PC").

Negative electrode: Metallic sodium

Discharge current density: 0.1 mA/cm$^2$

This discharge voltage in the plateau of discharge is 3.0 V or higher in the non-aqueous electrolyte sodium secondary battery produced using the positive electrode active material of the present invention.

Furthermore, the non-aqueous electrolyte sodium secondary battery produced using the positive electrode active material of the present invention shows high discharge capacity and excellent cycle characteristics (namely, less in reduction of discharge voltage even after repetition of charge and discharge).

EXAMPLE

The present invention will be explained in more detail by the following examples, which should not be construed as limiting the invention in any manner. Production of the electrode and test battery for charge and discharge test and measurement of powder X-ray diffraction were carried out by the following methods unless otherwise notified.

(1) Production of Test Battery for Charge and Discharge Test

The positive electrode active material, acetylene black (50% pressed product manufactured by Denki Kagaku Kogyo Kabushiki Kaisha) as a conductive material, and PTFE (Polyflon TFE F-201L (trade name) manufactured by Daikin Industries. Ltd.) as a binder are weighed so as to give a composition of active material:conductive material:binder=70:25:5 (weight ratio). First, the active material and the conductive material are mixed well by an agate mortar and then the binder is added to the mixture, followed by uniformly mixing them. The resulting mixture is molded to a square with a uniform thickness, and the molded square is bored by a cork borer of 1.5 cm in diameter to obtain a circular pellet. The pellet is put on a titanium expanded metal which is a positive electrode current collector, and they are lightly pressed by an agate pestle and then sufficiently contact bonded by a hand press to obtain a positive electrode pellet.

The positive electrode pellet is placed with the titanium mesh facing downward in a dent of bottom part of HS battery (manufactured by Hohsen Corporation), and a test battery is produced using in combination a 1 M $NaClO_4$/PC (having a conductivity of 5.42 mS/cm and manufactured by Toyama Pure Chemical Industries. Ltd.) as an electrolyte, a separator comprising two polypropylene porous films (CELGUARD 3501 (trade name) manufactured by Celgard K.K.) between which is interposed a glass filter (GA-100 (trade name) manufactured by Toyo Roshi Kaisha, Ltd.), and a negative electrode comprising metallic sodium (manufactured by Wako Pure Chemical Industries, Ltd.). The test battery is assembled in a glove box of argon atmosphere.

(2) Measurement of Powder X-Ray Diffraction

The measurement is conducted under the following conditions using model RINT2100HLR/PC manufactured by Rigaku Corporation.

X-ray: CuKα

Voltage-current: 50 kV-300 mA

Measuring angle range: 2θ=10–80°

Step: 0.01°

Scan speed: 2°/min

Example 1

(1) Synthesis of Positive Electrode Active Material $Na_2O_2$ (manufactured by Fluka Chemie AG) and $Fe_3O_4$ (manufactured by Aldrich Chemical Company, Inc.) were weighed in a globe box of argon atmosphere so that Na and Fe were at a stoichiometric ratio of $NaFeO_2$, and then they were mixed well by an agate mortar. The resulting mixture was put in a crucible made of alumina, and the crucible was placed in an electric furnace connected with a glove box which was previously evacuated by a vacuum pump and into which argon was introduced to replace the atmosphere, and the heating of the mixture was started in the furnace having the argon atmosphere. The electric furnace was opened in the air just before the temperature reached 100° C., and thereafter the heating was carried out in the air atmosphere, followed by keeping at 650° C. for 12 hours and then taking out the crucible into air at room temperature and rapidly cooling the crucible to obtain a positive electrode active material E1 for non-aqueous electrolyte sodium secondary battery. E1 was subjected to powder X-ray diffraction, and the results of the measurement is shown in FIG. 1. E1 had a hexagonal crystal structure and the value obtained by dividing the XRD peak intensity corresponding to an interplanar spacing of 2.20 Å by the XRD peak intensity corresponding to an interplanar spacing of 5.36 Å was 1.5.

(2) Evaluation of Charge and Discharge Performance when E1 was Used as a Positive Electrode Active Material of Sodium Secondary Battery A test battery was produced using E1 and was subjected to constant current charge and discharge test under the following conditions.

Current density: 0.1 mA/cm$^2$

Range of scanning potential: 1.5 V-3.5 V

The resulting charge and discharge curve is shown in FIG. 2. After charging of about 0.36 Na, a plateau of discharge of 3.3 V (vs. Na/Na$^+$) corresponding to the discharge of about 0.3 Na was recognized.

Example 2

(1) Synthesis of Positive Electrode Active Material $Na_2O_2$ (manufactured by Fluka Chemie AG) and $Fe_3O_4$ (manufactured by Aldrich Chemical Company, Inc.) were weighed in a globe box of argon atmosphere so that Na and Fe were at a stoichiometric ratio of $NaFeO_2$, and then they were mixed well by an agate mortar. The resulting mixture was put in a crucible made of alumina, and the crucible was placed in an electric furnace connected with a glove box which was previously evacuated by a vacuum pump and into which argon was introduced to replace the atmosphere, and the heating of the mixture was started in the furnace having the argon atmosphere. The electric furnace was opened in the air just before the temperature reached 100° C., and thereafter the heating was carried out in the air atmosphere, followed by keeping at 650° C. for 12 hours, then cooling to room temperature at a temperature falling rate of 30° C./hour in the furnace, and taking out the crucible from the electric furnace to obtain a positive electrode active material E2 for non-aqueous electrolyte sodium secondary battery. E2 had a hexagonal crystal structure, and the value obtained by dividing the XRD peak intensity corresponding to an interplanar spacing of 2.20 Å by the XRD peak intensity corresponding to an interplanar spacing of 5.36 Å was 1.3.

(2) Evaluation of Charge and Discharge Performance when E2 was Used as a Positive Electrode Active Material of Sodium Secondary Battery A test battery was produced using E2 and was subjected to constant current charge and discharge test under the following conditions.

Current density: 0.2 mA/cm$^2$

Range of scanning potential: 1.5 V-3.6 V

Although the current density was high, namely, 0.2 mA/cm$^2$, a plateau of discharge of 3.2 V (vs. Na/Na$^+$) corresponding to the discharge of about 0.34 Na was recognized after charging of 0.44 Na.

The compositional ratio of the positive electrode active material after synthesis was determined by a general method such as ICP-emission spectrochemical analysis or atomic absorption spectrometry, and the compositional ratio Na/Fe (before charging) of the positive electrode active material E2 of Example 2 was 0.82 (atomic absorption spectrometry).

INDUSTRIAL APPLICABILITY

When the positive electrode active material of the present invention is used, a non-aqueous electrolyte secondary battery can be obtained which is free from the rapid reduction of discharge voltage with the progress of discharge, high in discharge voltage in the plateau of discharge, namely, 3 V or higher, and excellent in characteristics as a secondary battery, and according to the production method of the present invention, the positive electrode active material of the present invention can be produced and hence the present invention is industrially very useful.

Figure 1:
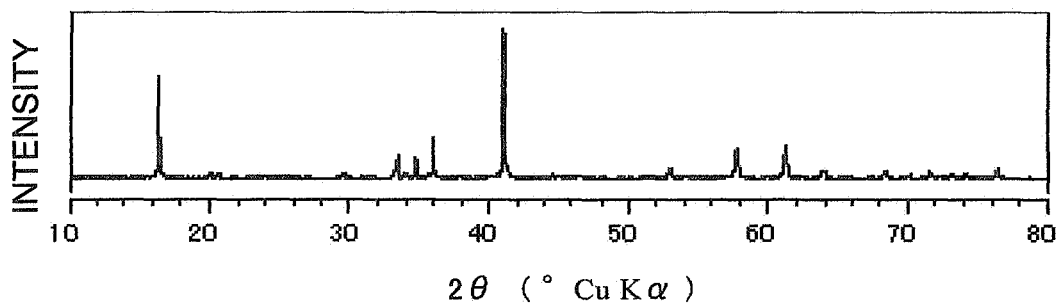
[FIG. 1] This shows the results of powder X-ray diffraction in Example 1.
Figure 2:
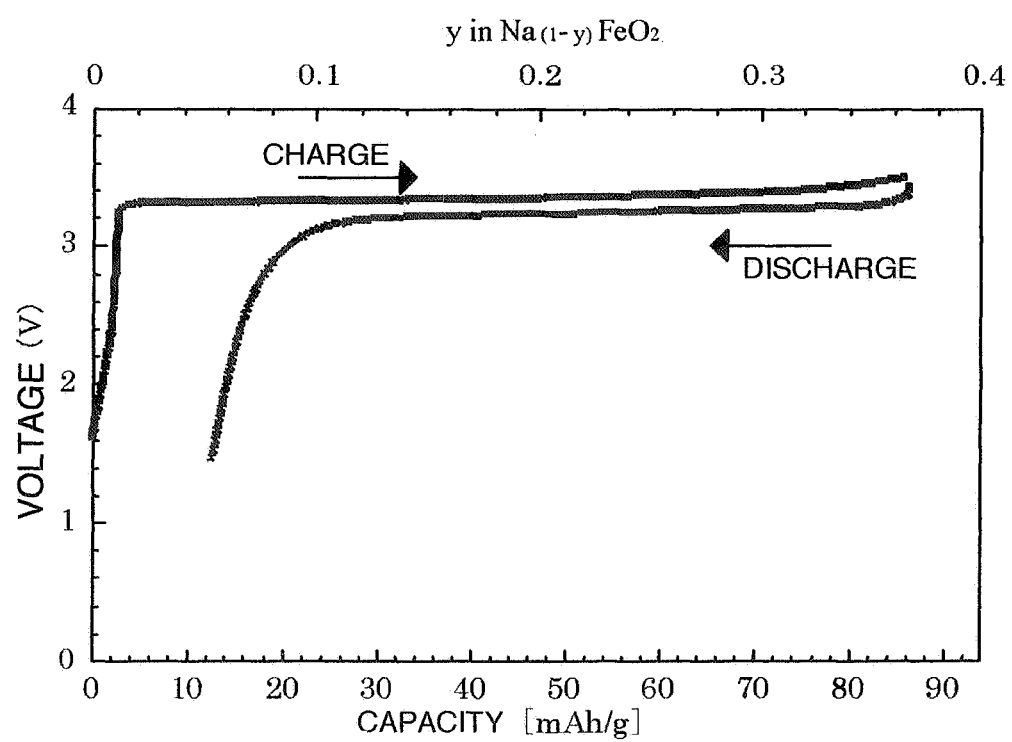
[FIG. 2] This shows a charge and discharge curve in Example 1.

The invention claimed is:

1. A non-aqueous electrolyte sodium secondary battery comprising a positive electrode active material, wherein the positive electrode active material comprises a composite oxide containing mainly iron and sodium, having a hexagonal crystal structure, and exhibiting a value of 2 or less obtained by dividing the XRD peak intensity corresponding to an interplanar spacing of 2.20 Å by the XRD peak intensity corresponding to an interplanar spacing of 5.36 Å, and charge carriers are sodium ions.

2. A non-aqueous electrolyte sodium secondary battery according to claim 1, wherein the composite oxide is represented by the formula $NaFe_{1-x}M_xO_2$ (where M is at least one element selected from the group consisting of trivalent metals, and x satisfies $0 \leq x < 0.5$).

* * * * *